United States Patent
Wisniewski et al.

(10) Patent No.: US 11,228,615 B2
(45) Date of Patent: Jan. 18, 2022

(54) TRANSPARENT ENFORCEMENT OF DATA POLICIES

(71) Applicant: salesforce.com, inc., San Francisco, CA (US)

(72) Inventors: Scott Wisniewski, Issaquah, WA (US); David Lucey, Arlington, WA (US); David Murray, Seattle, WA (US); Xiongjian Fu, Sammamish, WA (US)

(73) Assignee: salesforce.com, inc., San Francisco, CA (US)

(*) Notice: Subject to any disclaimer, the term of this patent is extended or adjusted under 35 U.S.C. 154(b) by 276 days.

(21) Appl. No.: 16/051,147

(22) Filed: Jul. 31, 2018

(65) Prior Publication Data
US 2020/0045080 A1    Feb. 6, 2020

(51) Int. Cl.
*H04L 29/06* (2006.01)
*H04L 29/08* (2006.01)

(52) U.S. Cl.
CPC .......... *H04L 63/20* (2013.01); *H04L 63/0428* (2013.01); *H04L 63/166* (2013.01); *H04L 67/2842* (2013.01)

(58) Field of Classification Search
CPC ... H04L 63/20; H04L 63/0482; H04L 63/166; H04L 67/2842; H04L 63/0281; H04L 63/0428; H04L 63/0471; H04L 67/2823; H04L 69/22
See application file for complete search history.

(56) References Cited

U.S. PATENT DOCUMENTS

| | | | | |
|---|---|---|---|---|
| 7,136,359 | B1* | 11/2006 | Coile | H04L 63/0236 370/248 |
| 8,745,373 | B2* | 6/2014 | Molsberry | H04L 63/20 713/153 |
| 9,065,725 | B1* | 6/2015 | Nanda | G06F 9/45529 |
| 9,288,234 | B2* | 3/2016 | Barr | H04L 63/20 |
| 9,473,298 | B2* | 10/2016 | Wante | H04L 61/2528 |
| 2009/0327695 | A1* | 12/2009 | Molsberry | H04L 63/0428 713/151 |

(Continued)

OTHER PUBLICATIONS

S. Kent, K. Seo, "Security Architecture for the Internet Protocol", (https://tools.ietf.org/html/rfc4301), RFC 4301, Section 5.1.2.—Header Construction for Tunnel Mode, Dec. 2005 (Year: 2005).*

*Primary Examiner* — Theodore C Parsons
(74) *Attorney, Agent, or Firm* — Holland & Hart LLP

(57) ABSTRACT

Methods, systems, and devices for transparent data encryption are described. A transparent proxy may enforce a specific encryption policy for a data transmission from a source host to a target host, where the transparent proxy determines if the data transmission is encrypted according to a specific encryption policy prior to forwarding the data transmission to the target host. As such, if the data transmission is not encrypted according to the specific encryption policy, the transparent proxy may encrypt the data transmission and then forward it to the target host. Alternatively, if the transparent proxy determines that the data transmission is encrypted according to the specific encryption policy, then the transparent proxy may refrain from further encrypting the data transmission and forward the data transmission to the target host without the additional encryption.

18 Claims, 13 Drawing Sheets

(56) References Cited

U.S. PATENT DOCUMENTS

| | | | |
|---|---|---|---|
| 2013/0166703 A1* | 6/2013 | Hammer | H04L 63/10 709/220 |
| 2015/0121076 A1* | 4/2015 | Wante | G06F 21/6245 713/171 |
| 2015/0163109 A1* | 6/2015 | Ionescu | H04L 43/08 709/224 |

* cited by examiner

TRANSPARENT ENFORCEMENT OF DATA POLICIES

FIELD OF TECHNOLOGY

The present disclosure relates generally to database systems and data processing, and more specifically to transparent enforcement of data policies.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Data may be encrypted while it is being transmitted between a source host and a target host in the cloud platform or a database system within the cloud platform. In some cases, both the source host and the target host may be specially configured to support the encrypted messaging. Additionally or alternatively, a server between the source host and the target host (e.g., a middle man) may decrypt the data and transmit the data to the target host. However, utilizing the special configurations and/or middle man servers may result in unreliable data transmissions as a single point may fail (e.g., the source host, the target host, or the middle man) and the data transmission may be compromised. Additionally, the data may be encrypted multiple times according to different data transmission schemes that utilize separate encryptions, which may increase processing time and degrade system performance for the cloud platform.

DETAILED DESCRIPTION

When transmitting or receiving data between a source host (e.g., a first database server, virtual machine, container, etc.) and a target host (e.g., a second database server, virtual machine, container, etc.) within a database system, the data may go through a proxy (e.g., a proxy server) that acts as an intermediary between the two hosts. In some cases, data processing at the target host may be based on where the data originated from (e.g., the target host may verify whether the source host is allowed to transmit the data to the target host). Accordingly, the proxy may act as a transparent proxy for data forwarding, where an indicator of the source host (e.g., an internet protocol (IP) address associated with the source device) is modified in the data transmission or request such that the data transmission or request will be identified as coming from the source host rather than from the proxy (e.g., the proxy impersonates the source host during retransmission of the data). By obscuring the proxy, the proxy may be added into any existing system without modifying functionality at either the source or target host. In some cases, the source host and the target host may be part of a container configuration, virtual machine configuration, or bare metal configuration.

Additionally, it may be necessary to ensure that the data transmission from the source host to the target host is encrypted according to an encryption policy of the database system. As such, the proxy, after intercepting the data, may determine if the data transmission is encrypted according to the correct encryption policy and, if not, may encrypt the data transmission before forwarding the data along to the target host. By applying encryption only if data is not already encrypted according to the correct encryption policy, the transparent proxy may avoid redundant encryption, reducing the complexity and latency of the system. In some cases, the proxy may retrieve the encryption policy from a local memory cache that contains one or more data policies for the database system. Alternatively, the local memory cache may not contain the encryption policy and may transmit an indication (e.g., a cache-miss indication) to the proxy signifying that the encryption policy was not found in the local memory cache. Accordingly, the proxy may retrieve the encryption policy on demand from an encryption policy manager (e.g., a master datastore of policies for the database system).

Aspects of the disclosure are initially described in the context of an environment supporting an on-demand database service. Additionally, aspects of the disclosure are further described with reference to an encrypted data stream transmission, different configuration examples, and a process flow. Aspects of the disclosure are further illustrated by and described with reference to apparatus diagrams, system diagrams, and flowcharts that relate to transparent enforcement of data policies.

Figure 1:
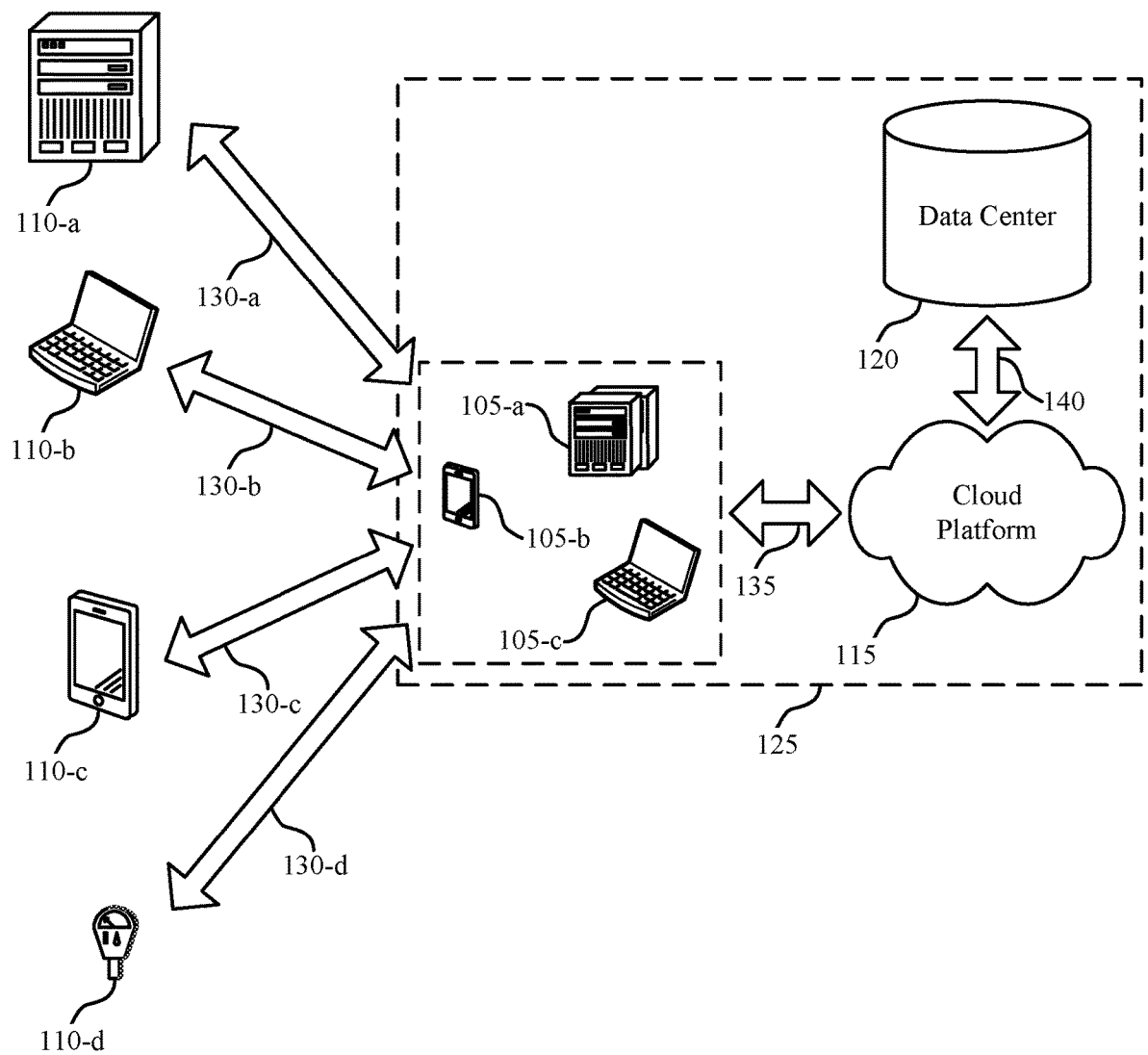
FIG. 1 illustrates an example of a system for applying data policies to a data stream at a transparent proxy that supports transparent enforcement of data policies in accordance with aspects of the present disclosure.

FIG. 1 illustrates an example of a system 100 for cloud computing that supports transparent enforcement of data policies in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transmission control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may include multiple entities (e.g., database servers, virtual machines, containers, databases, etc.) for storing data and/or performing data processing within data center 120. Additionally, the multiple entities may transmit data streams amongst each other, where a source host (e.g., a first entity) transmits a data stream to a target host (e.g., a second entity) based on the target host performing a data process, a data migration, or a similar request for the data transmission. As such, when transmitting the data stream, both hosts may ensure that the data stream is encrypted while in transit (e.g., on the wire) across data center 120 to protect the data stream and prevent malicious users from obtaining the unencrypted data streams.

Additionally, in some cases, data processing at the target host may be based on where the data stream originated from (e.g., the target host may verify whether the source host is allowed to transmit the data stream to the target host). Accordingly, a proxy may act as a transparent proxy for data forwarding, where a source header on the forwarded data stream (e.g., a data stream transmission or request) is modified to include an indicator of the source host (e.g., an IP address associated with the source host) such that the forwarded data stream will be identified as coming from the source host rather than from the proxy (e.g., the proxy impersonates the source host). The proxy may further be configured to determine if the data stream is encrypted according to a specific encryption policy prior to the data forwarding. If the proxy determines that the data stream is not encrypted according to the specific encryption policy, then the proxy may encrypt the data stream accordingly and transmit the encrypted data stream to a second proxy associated with the target host. Subsequently, the second proxy may decrypt the encrypted data stream based on the specific encryption policy for data center 120 and then transmit the decrypted data stream to the target host. The specific encryption policy may be contained in respective local memory caches for each proxy and/or in a master datastore of policies for data center 120 that each proxy may access if the specific encryption policy is not contained in the local memory cache.

Conventional systems may fail to securely and transparently transmit data from a source host to a target host within a data center 120. In a first example, the source and target hosts may utilize a virtual private network (VPN) (e.g., a point-to-point link), where both the source and target hosts may be specially configured to support encrypted messaging. Additionally, an entity in between the source and target host (e.g., a middle man) may decrypt the data and send the data to the target host. However, this entity in between the two hosts may reveal a location where a single point failure may impact the encrypted transmission. By having a single point be vulnerable to failure for the transmission operation, the operation may be unreliable for large scale deployments and robustness for the operation may be degraded. Additionally, utilizing VPNs may result in performing unnecessary encryptions on the data. For example, the data may first be encrypted based on a hypertext transfer protocol secure (HTTPS) communication between the two hosts and then may be encrypted a second time according to the VPN. In a second example, a proxy server may be configured to transmit data from a source host in data center 120 to a target host outside of data center 120 (e.g., between multiple companies). However, the source and target hosts may need to know about the proxy server in order to correctly encrypt and decrypt the data, which may affect reprogramming software in data center 120 (e.g., for the source and target hosts) or changing the infrastructure in data center 120 to accommodate the proxy server.

The system 100 may support transparent and secure data transmissions using one or more transparent proxies between a source host and a target host in a data center 120. For example, a transparent proxy at the source host may modify an identifier for the source host into a source header for the data transmission such that the target host does not detect the transparent proxy and the data appears to be sent from the source host alone. By obscuring the transparent proxy, the transparent proxy may be added into any existing system (e.g., data center 120) without modifying functionality at either the source or target host. Additionally, the transparent proxy may enforce a specific encryption policy for the data transmission, where the transparent proxy determines if the data transmission is encrypted according to the specific encryption policy prior to forwarding the data transmission to the target host. As such, if the data transmission is not encrypted according to the standard, the transparent proxy may encrypt the data transmission and then forward it to the target host. Alternatively, if the transparent proxy determines that the data transmission is encrypted according to the specific encryption policy, then the transparent proxy may refrain from further encrypting the data transmission and forward the data transmission to the target host without the additional encryption. By applying encryption only if data is not already encrypted according to the correct encryption policy, the transparent proxy may avoid redundant encryption, reducing the complexity and latency of the system.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
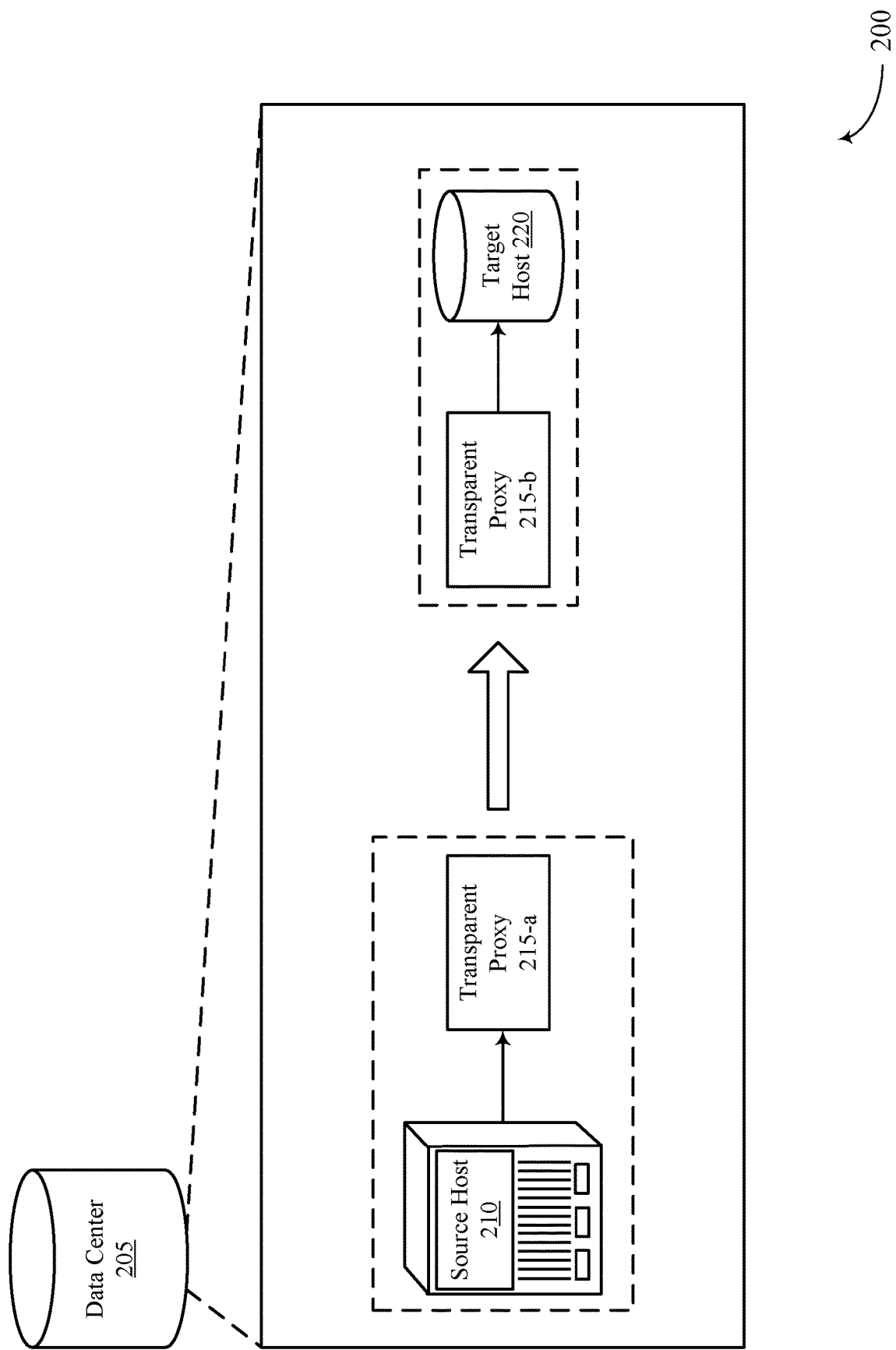
FIG. 2 illustrates an example of an encrypted data stream transmission that supports transparent enforcement of data policies in accordance with aspects of the present disclosure.

FIG. 2 illustrates an example of an encrypted data stream transmission 200 that supports transparent enforcement of data policies in accordance with aspects of the present disclosure. As described herein, encrypted data stream transmission 200 may support transparent in-transit encryption for data within a data center 205, while limiting impact to existing deployments in data center 205.

When data enters or leaves a host, a proxy associated with the host may intercept the data and transparently encrypt the data. For example, when data is transmitted from a source host 210 to a target host 220, a transparent proxy 215-*a* associated with source host 210 may determine if the data is encrypted according to an encryption policy for data center 205. If the data is not adequately encrypted, transparent proxy 215-*a* may, accordingly, encrypt the data before transmitting the data to target host 220, where a transparent proxy 215-*b* intercepts the encrypted data, decrypts the data according to the encryption policy for data center 205, and forwards the decrypted data to target host 220. As such, a policy engine may be utilized to determine when to apply encryption (and when not to) based on a global network policy for data center 205. While source host 210 is shown to be a server, and target host 220 is shown to be a database in the example of FIG. 2, it is to be understood that source host 210 and target host 220 may be any kind of storage and/or processing device within data center 205.

In some cases, transparent proxies 215 may be installed by a feature provided by an operating system for data center 205. Each transparent proxy 215 may run on a single node in data center 205 (e.g., transparent proxy 215-*a* runs on source host 210 and transparent proxy 215-*b* runs on target host 220). Accordingly, each transparent proxy 215 may allow each node (e.g., host, application, etc.) to transparently intercept transmission control protocol (TCP) and user datagram protocol (UDP) network traffic. For example, transparent proxy 215-*a* may intercept traffic leaving a host (e.g., node) and redirect the traffic to an arbitrary address and port. The intercepted traffic may then be sent without modifying its headers, allowing transparent proxy 215-*a* to determine the original source (e.g., source host 210) and destination addresses (e.g., target host 220). Accordingly, transparent proxy 215-*a* may mark outbound connections for the intercepted traffic as "transparent," allowing transparent proxy 215-*a* to impersonate the original source (e.g., using an IP address for source host 210). Additionally, transparent proxy 215-*b* may intercept the traffic from transparent proxy 215-*a* and further impersonate the original source before forwarding the traffic to the destination address(es). As such, both transparent proxy 215-*a* and transparent proxy 215-*b* may be transparent to both source host 210 and target host 220. Source host 210 (e.g., the sender) may create an outbound request to an actual destination address, and target host 220 (e.g., the receiver) may see an identifier for source host 210 (e.g., public IP address) as the source of the traffic.

Additionally, each transparent proxy 215 may be designed to avoid double encryption. For example, a bit may be added to a metadata service (e.g., a declarative metadata service) that contains the encryption policy for data center 205, which marks roles and ports use "blessed protocols" (e.g., mutual transport layer security (mTLS)) and which roles and ports do not use the "blessed protocols." Intercepted traffic destined for "blessed" hosts and/or ports may pass through the transparent proxy 215 unmodified. For example, if target host 220 is marked as using a "blessed protocol" in the metadata service, transparent proxies 215-*a* and 215-*b* may allow traffic from any source in data center 205 (e.g., source host 210) to pass through unmodified (e.g., not applying the encryption policy) intended for target host 220. As such, the transparent proxies 215 may determine whether a 5-tuple connection (e.g., protocol, source host IP, source port, target host IP, and target port) is known to be secure or not.

Alternatively, if target host 220 is marked as not using a "blessed protocol," traffic intended for it from any source in data center 205 may be forwarded through a transport layer security (TLS) tunnel established between the transparent proxies 215 running on the source and target host 220 (e.g., transparent proxies 215-a 215-b) to encrypt/decrypt the traffic when the traffic is travelling between the two hosts. Based on the "blessed protocol" indication, a transparent proxy 215 may assume whether or not a source host has encrypted the traffic prior to transmission because if the target host indicated in the destination address uses the "blessed protocols," the source host may identify the protocol and encrypt the traffic accordingly prior to transmission. As such, all network traffic in data center 205 may be ensured to be encrypted, even if the software performing the communications has not been explicitly written to encrypt the network traffic.

In some cases, transparent proxies 215-a and 215-b may apply the encryption policy to intercepted traffic based on encryption policies according to the metadata service. Additionally or alternatively, the encryption policy may be loaded on each machine (e.g., source host 210 and target host 220) and stored in a local memory cache for each machine. Data center 205 may refresh the local memory cache periodically to provide up-to-date information for each machine (e.g., encryption policies, permissions on who is allowed to talk to who, etc.). However, if the encryption policy is not found in the local memory cache (e.g., a cache-miss), the transparent proxies 215 may retrieve the encryption policy (or any additional missing information) on-demand from the metadata service. The metadata service may include a master datastore of policies for data center 205.

As noted above, the transparent proxies 215 may intercept TCP and UDP traffic entering or leaving a host. Accordingly, the transparent proxies 215 may apply the same encryption policies for both intercepted TCP and UDP traffic. In some cases, tunneling TCP traffic over TLS may offer an improved network throughput than conventional techniques (e.g., IP Security (IPSec)).

Additionally, data center 205 may implement machine learning based on the intercepted traffic and the transparent proxies 215 determining whether or not to encrypt the intercepted traffic. For example, a set of rules may be determined based on what "good" messages (e.g., encrypted according to the encryption policy) and what "bad" messages (e.g., not encrypted according to the encryption policy) look like to enable mapping of memory for the different types of messages. As such, the transparent proxies 215 may dynamically determine whether to encrypt intercepted traffic or not based on the determined set of rules.

In some cases, the transparent proxies 215 may apply additional structures or standards to intercepted traffic. For example, transparent proxies 215-a and 215-b may implement metrics on the intercepted traffic from source host 210 to target host 220, such that if an anomaly is detected compared to a standard message format, the transparent proxies 215 may report the anomaly to data center 205. Additionally or alternatively, transparent proxies 215-a and 215-b may apply additional policies to intercepted traffic between the two hosts.

Each transparent proxy 215 may be deployed as one instance per physical host (e.g., source host 210, target host 220, etc.) in data center 205. In some cases (e.g., hyper-visor and/or container scenarios), all virtual machines and/or containers on a single physical host may share a same transparent proxy 215 instance. Accordingly, the performance impact of the transparent proxy may be minimized on the physical host. For example, if one transparent proxy 215 is run per virtual machine and/or container, the amount of processing to run each transparent proxy 215 may increase, thereby increasing the impact the transparent proxies 215 have on the performance of the physical host. However, if all the virtual machines and/or containers share the same transparent proxy 215, the amount of processing of the single transparent proxy 215 may minimize the impact of running proxies on the performance of the physical host. The techniques as described above may be implemented in a variety of machine configurations (e.g., virtual machine, container, or bare-metal configurations).

Figure 3:
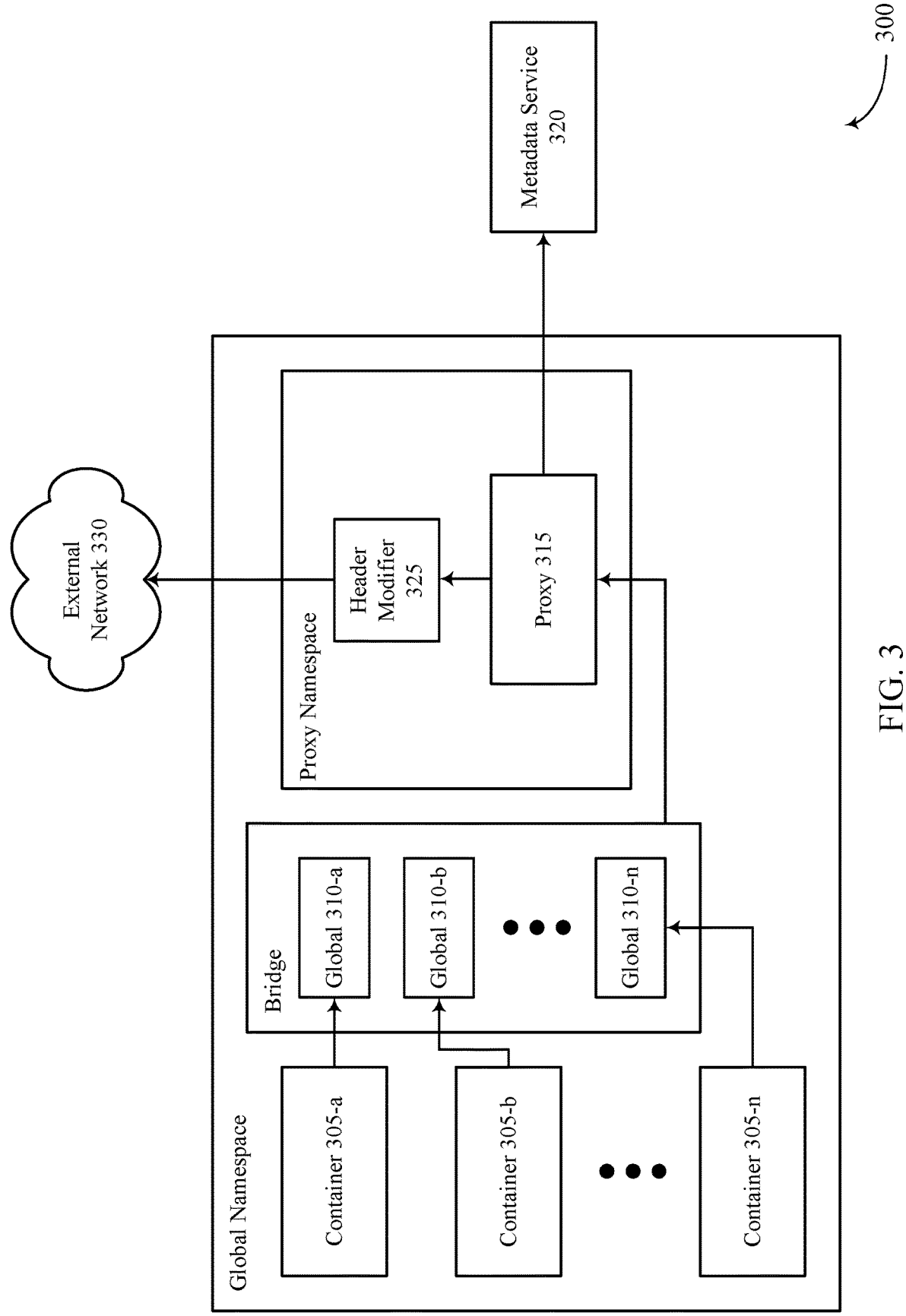
FIG. 3 illustrates an example of a container configuration that supports transparent enforcement of data policies in accordance with aspects of the present disclosure.

FIG. 3 illustrates an example of a container configuration 300 that supports transparent enforcement of data policies in accordance with aspects of the present disclosure. As described herein, traffic may be transmitted from a source host to a target host within a data center, where the traffic may be ensured to be encrypted according to an encryption policy for the data center by utilizing a transparent proxy at each host. In some cases, the source host and/or the target host may include container configuration 300 as described with reference to FIG. 3.

Container configuration 300 may include a number (n) of containers 305, where each container 305 runs with a unique address (e.g., company specific private IP address). A container host (e.g., a source or target host that utilizes container configuration 300) may run a protocol in the background (e.g., a border gateway protocol (BGP) daemon) to broadcast routes for all containers 305 (via the container host) to the rest of the data center network. Traffic from each container 305 may flow through a bridge that assigns a respective global address 310 for each container 305 and its associated traffic.

A proxy 315 (e.g., a transparent proxy) may be installed on the container host and configured to intercept all container traffic after it flows through the bridge. Proxy 315 may retrieve an encryption policy from a metadata service 320 and determine if the intercepted container traffic is encrypted according to the encryption policy. In some cases, metadata service 320 may be a local memory cache. As described above, proxy 315 may encrypt the traffic if it is not appropriately configured or may not modify the traffic if it is encrypted according to the encryption policy. Proxy 315 may then utilize a header modifier 325 to transparently transmit the intercepted traffic to an external network 330 (e.g., the target host). Header modifier 325 may modify a source header in the intercepted traffic to include a source indicator for the container host such that external network 330 identifies the traffic as coming from the container host and not proxy 315 (e.g., proxy 315 impersonates the container host).

Figure 4:
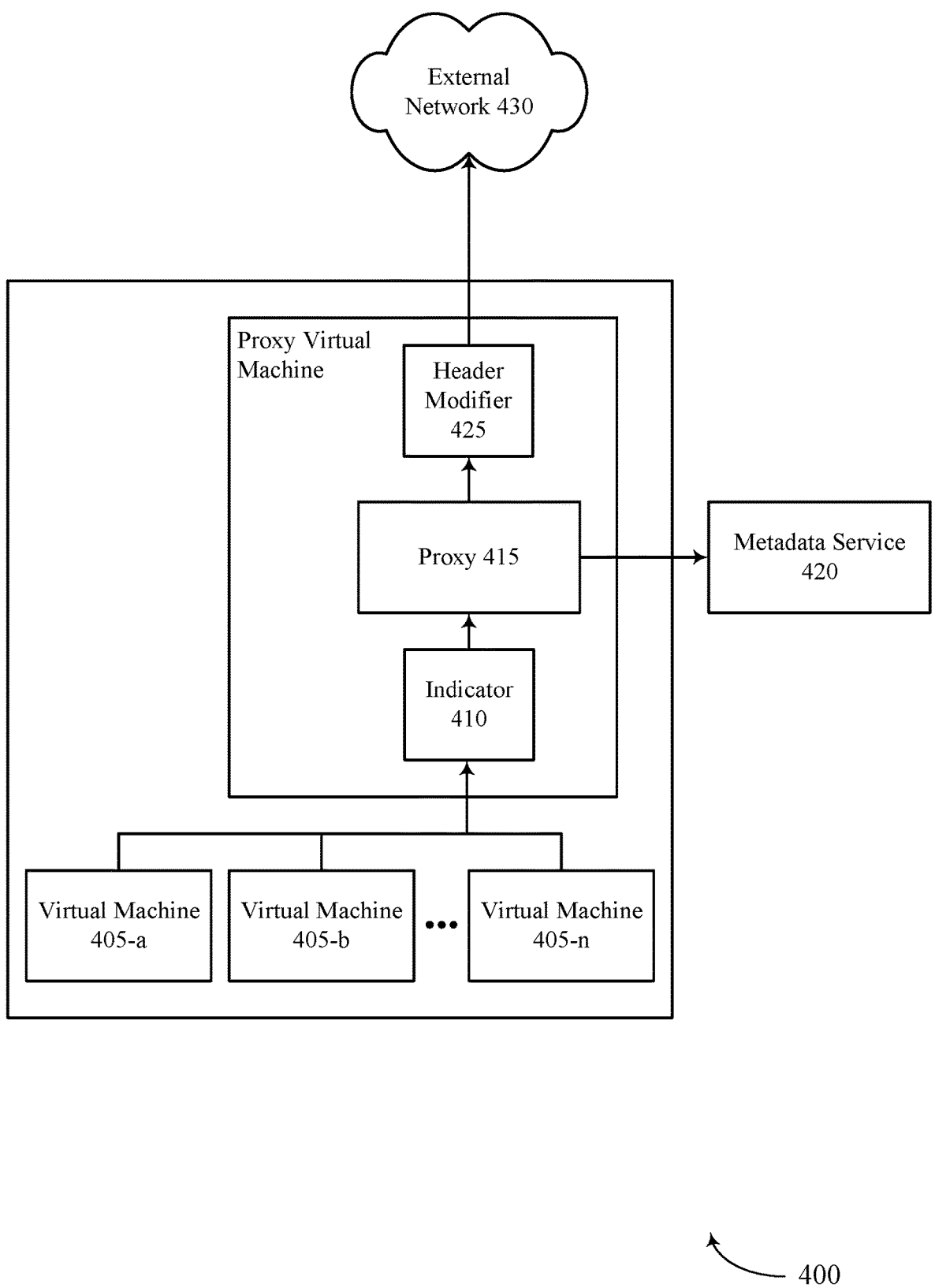
FIG. 4 illustrates an example of a virtual machine configuration that supports transparent enforcement of data policies in accordance with aspects of the present disclosure.

FIG. 4 illustrates an example of a virtual machine configuration 400 that supports transparent enforcement of data policies in accordance with aspects of the present disclosure. As described herein, traffic may be transmitted from a source host to a target host within a data center, where the traffic may be ensured to be encrypted according to an encryption policy for the data center by utilizing a transparent proxy at each host. In some cases, the source host and/or the target host may include virtual machine configuration 400 (e.g., hyper-visor configuration) as described with reference to FIG. 4.

Virtual machine configuration 400 may include a number (n) of virtual machines 405 for a virtual machine host. The virtual machine host may utilize a protocol (e.g., a BGP) to broadcast routes for virtual machines 405 on a given host to flow through a dedicated proxy virtual machine. For example, each virtual machine 405 may include a same network interface that corresponds to an indicator 410 of the proxy virtual machine. A proxy 415 (e.g., a transparent proxy) may be installed on the proxy virtual machine on the virtual machine host (e.g., physical host). Proxy 415 may receive traffic from all virtual machines that further include the same indicator 410 and determine if the traffic is encrypted according to an encryption policy retrieved from a metadata service 420. As described above, metadata service 420 may be a local memory cache for the virtual machine host. Proxy 415 may then utilize a header modifier 425 to transparently transmit the intercepted traffic to an external network 430 (e.g., the target host), where header modifier 425 modifies a source header in the intercepted traffic to include a source indicator for the virtual machine host such that external network 430 identifies the traffic as coming from the virtual machine host and not proxy 415 (e.g., proxy 415 impersonates the virtual machine host).

Figure 5:
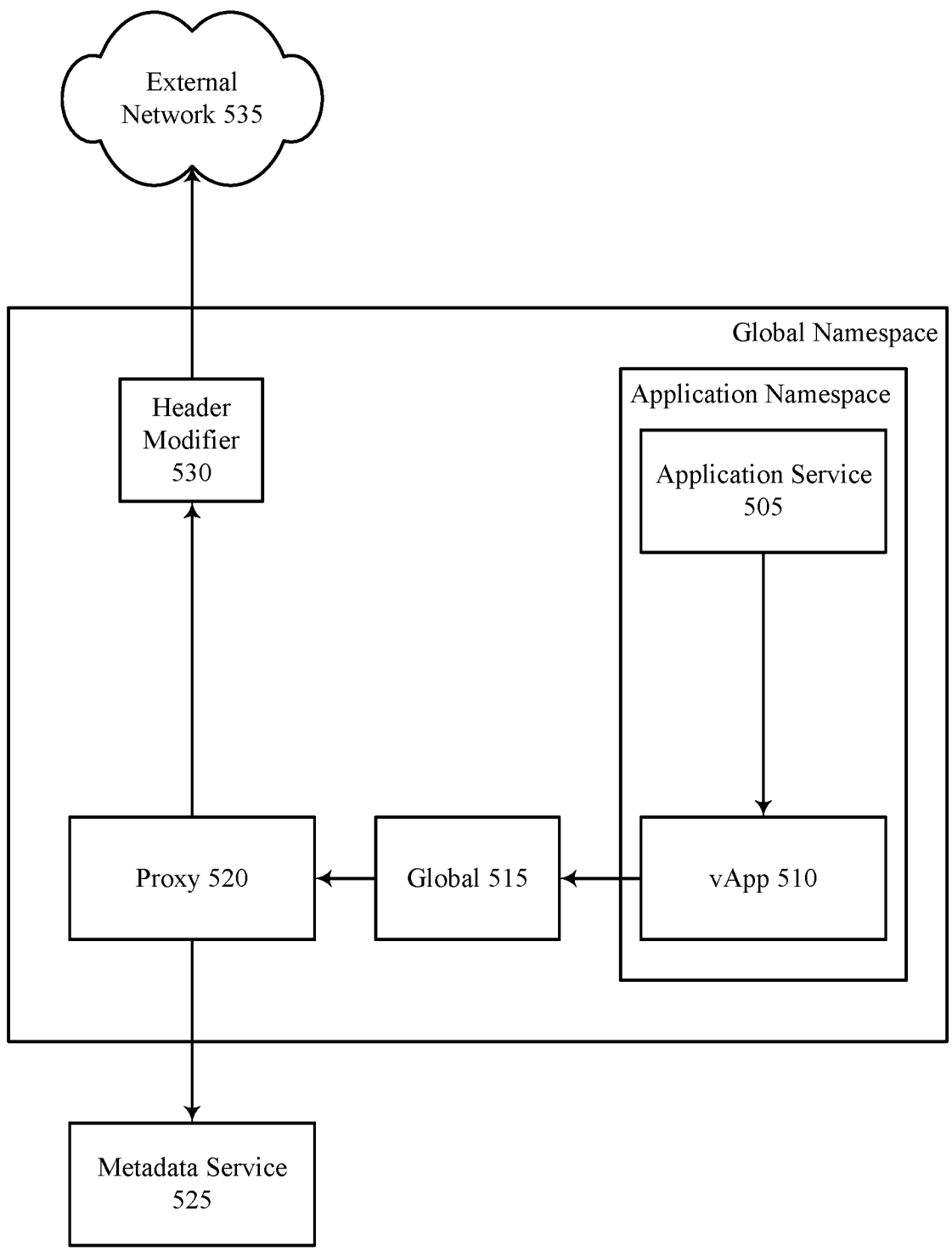
FIG. 5 illustrates an example of a bare metal configuration that supports transparent enforcement of data policies in accordance with aspects of the present disclosure.

FIG. 5 illustrates an example of a bare metal configuration 500 that supports transparent enforcement of data policies in accordance with aspects of the present disclosure. As described herein, traffic may be transmitted from a source host to a target host within a data center, where the traffic may be ensured to be encrypted according to an encryption policy for the data center by utilizing a transparent proxy at each host. In some cases, the source host and/or the target host may include bare metal configuration 500 (e.g., installed directly on hardware) as described with reference to FIG. 5.

Bare metal configuration 500 may include an application service 505 where traffic intended for the target host from a bare metal host (e.g., source host) is located. The traffic may flow through a vApp 510 from application service 505, where vApp 510 associates the traffic with an address for an application namespace (e.g., a single network namespace). The traffic may then be routed through a global address 515 to associate the traffic with a global namespace for the bare metal host. A proxy 520 (e.g., a transparent proxy) may be located in the global namespace and may provide a route for traffic (e.g., packets) leaving the application namespace. As such, proxy 520 may intercept the traffic and determine whether it is encrypted according to an encryption policy retrieved from a metadata service 525 (e.g., a local memory cache). Proxy 520 may then utilize a header modifier 530 to transparently transmit the intercepted traffic to an external network 535 (e.g., the target host). Header modifier 530 may modify a source header in the intercepted traffic to include a source indicator for the container host such that external network 535 identifies the traffic as coming from the container host and not proxy 520 (e.g., proxy 520 impersonates the container host).

Figure 6:
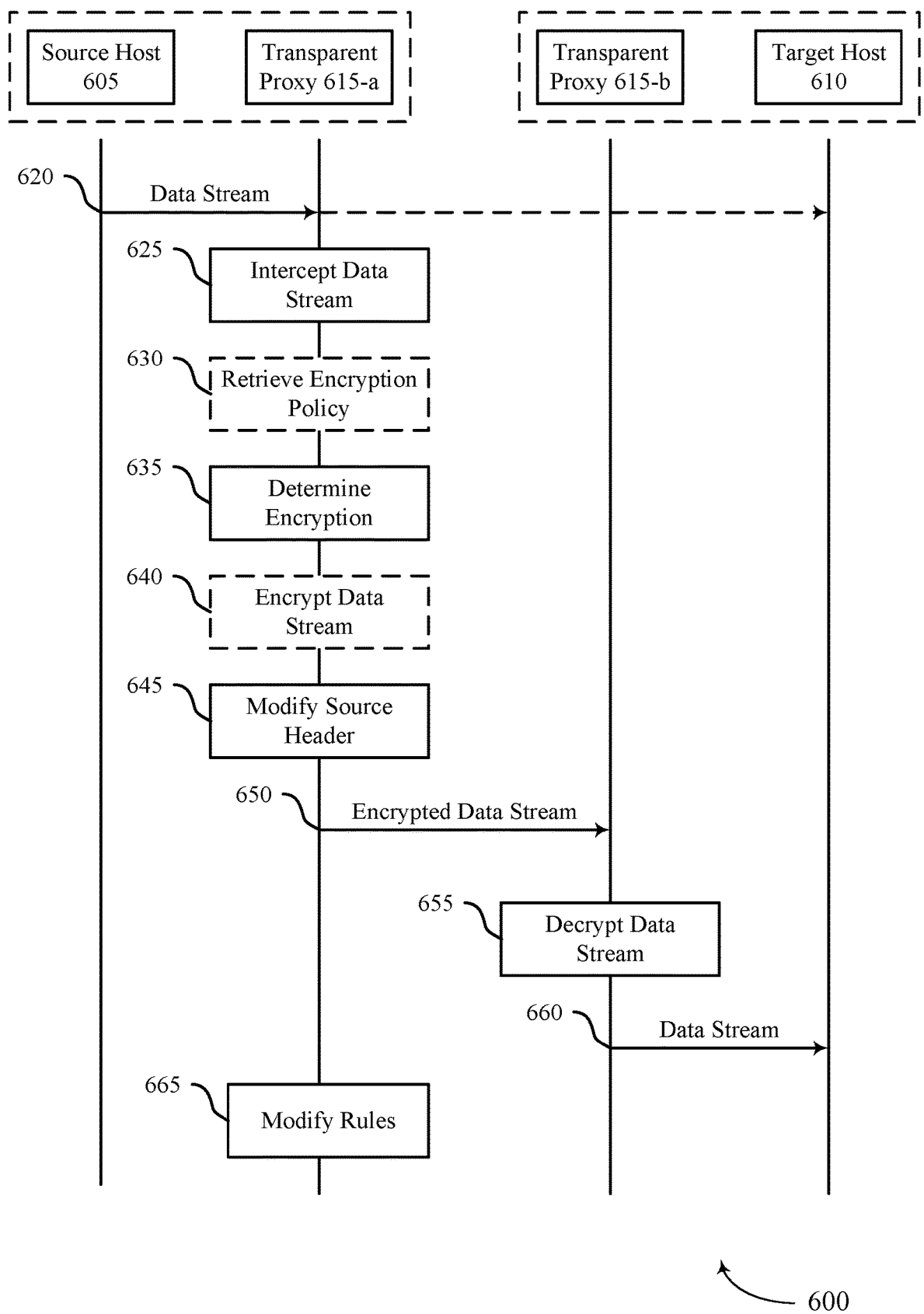
FIG. 6 illustrates an example of a process flow that supports transparent enforcement of data policies in accordance with aspects of the present disclosure.

FIG. 6 illustrates an example of a process flow 600 that supports transparent enforcement of data policies in accordance with aspects of the present disclosure. Process flow 600 may include a source host 605, a transparent proxy 615-*a*, a transparent proxy 615-*b*, and a target host 610, where each host and transparent proxy may be examples of corresponding devices as described above with reference to FIGS. 1-5. Process flow 600 may illustrate techniques for applying data policies to a data stream at a transparent proxy.

In the following description of the process flow 600, the operations between source host 605, transparent proxy 615-*a*, transparent proxy 615-*b*, and target host 610 may be performed in different orders or at different times. Certain operations may also be left out of the process flow 600, or other operations may be added to the process flow 600. It is to be understood that while transparent proxy 615-*a* is shown performing a number of the operations of process flow 600, any corresponding device may perform the operations shown (e.g., an application server, database server, etc.).

At 620, source host 605 may transmit a data stream (e.g., traffic) to target host 610. In some cases, the data stream may include TCP traffic, UDP traffic, or a combination thereof. Additionally, source host 605, target host 610, or a combination thereof may include a virtual machine configuration, a bare metal configuration, a container configuration, or a combination thereof.

At 625, transparent proxy 615-*a* may intercept the data stream transmitted from source host 605 to target host 610. In some cases, transparent proxy 615-*a* and/or transparent proxy 615-*b* may be deployed on a per physical host basis (e.g., each transparent proxy is associated with one host). For example, transparent proxy 615-*a* may be deployed for source host 605, and transparent proxy 615-*b* may be deployed for target host 610. Additionally, each transparent proxy 615-*a* and/or 615-*b* may support one or more virtual machines, one or more containers, or a combination thereof, and, as such, the one or more virtual machines, the one or more containers, or the combination thereof may include one physical host.

At 630, transparent proxy 615-*a* may retrieve a specific encryption policy from a local memory cache. Additionally or alternatively, in some cases, transparent proxy 615-*a* may receive, from the local memory cache, a cache-miss indication for the specific encryption policy. Based on the cache-miss indication, transparent proxy 615-*a* may retrieve the specific encryption policy on demand from an encryption policy manager (e.g., metadata service, master data store of policies, etc.). In some cases, transparent proxy 615-*a* may refresh the local memory cache periodically from the encryption policy manager, where refreshing the local memory cache includes updating the specific encryption policy stored at the local memory cache.

At 635, transparent proxy 615-*a* may determine that a portion of the data stream fails to comply with the specific encryption policy. Additionally or alternatively, transparent proxy 615-*a* may determine that an additional portion of the data stream is encrypted according to the specific encryption policy. In some cases, transparent proxy 615-*a* may determine whether portions of the data stream are encrypted according to the specific encryption policy based on determining whether a protocol for the data stream, IP address for source host 605, a port for source host 605, an IP address for target host 610, a port for target host 610, or a combination thereof corresponds to a secure connection using the specific encryption policy (e.g., a 5-tuple secure connection).

At 640, transparent proxy 615-*a* may encrypt the portion of the data stream according to the specific encryption policy based on determining that the portion of the data stream fails to comply with the specific encryption policy.

At 645, transparent proxy 615-*a* may modify a source header of the data stream to include a source indicator of source host 605 such that the data stream is identifiable as a transmission by source host 605 based on the modified source header (e.g., transparent proxy 615-*a* impersonates source host 605).

At 650, transparent proxy 615-*a* may transmit the data stream with the modified source indicator, where the data stream is encrypted according to the specific encryption policy. In some cases, transparent proxy 615-*a* may transmit the data stream without encrypting the additional portion of the data stream based on determining that the additional portion of the data stream is encrypted according to the specific encryption policy. As such, transmitting the data stream without encrypting the additional portion may avoid double encryption of the data stream. Additionally, transparent proxy 615-*a* may establish a TLS or mTLS tunnel with transparent proxy 615-*b* (e.g., at target host 610) and transmit the data stream through the TLS or mTLS tunnel to transparent proxy 615-*b*.

At 655, transparent proxy 615-*b* may decrypt the encrypted data stream based on the specific encryption policy. Subsequently, at 660, transparent proxy 615-*b* may then transmit the decrypted data stream to target host 610. Based on the modified source header, target host 610 may identify the data stream as coming from source host 605 and not identify transparent proxies 615-*a* or 615-*b*.

At 665, transparent proxy 615-*b* may modify a set of rules for an encryption policy engine based on determining that the portion of the data stream is not encrypted according to the specific encryption policy (e.g., perform machine learning). Accordingly, in some cases, transparent proxy 615-*b* may intercept a further additional data stream transmitted from source host 605 to target host 610 and determine that a portion of the further additional data stream fails to comply with the specific encryption policy based on the modified set of rules for the encryption policy engine.

Figure 7:
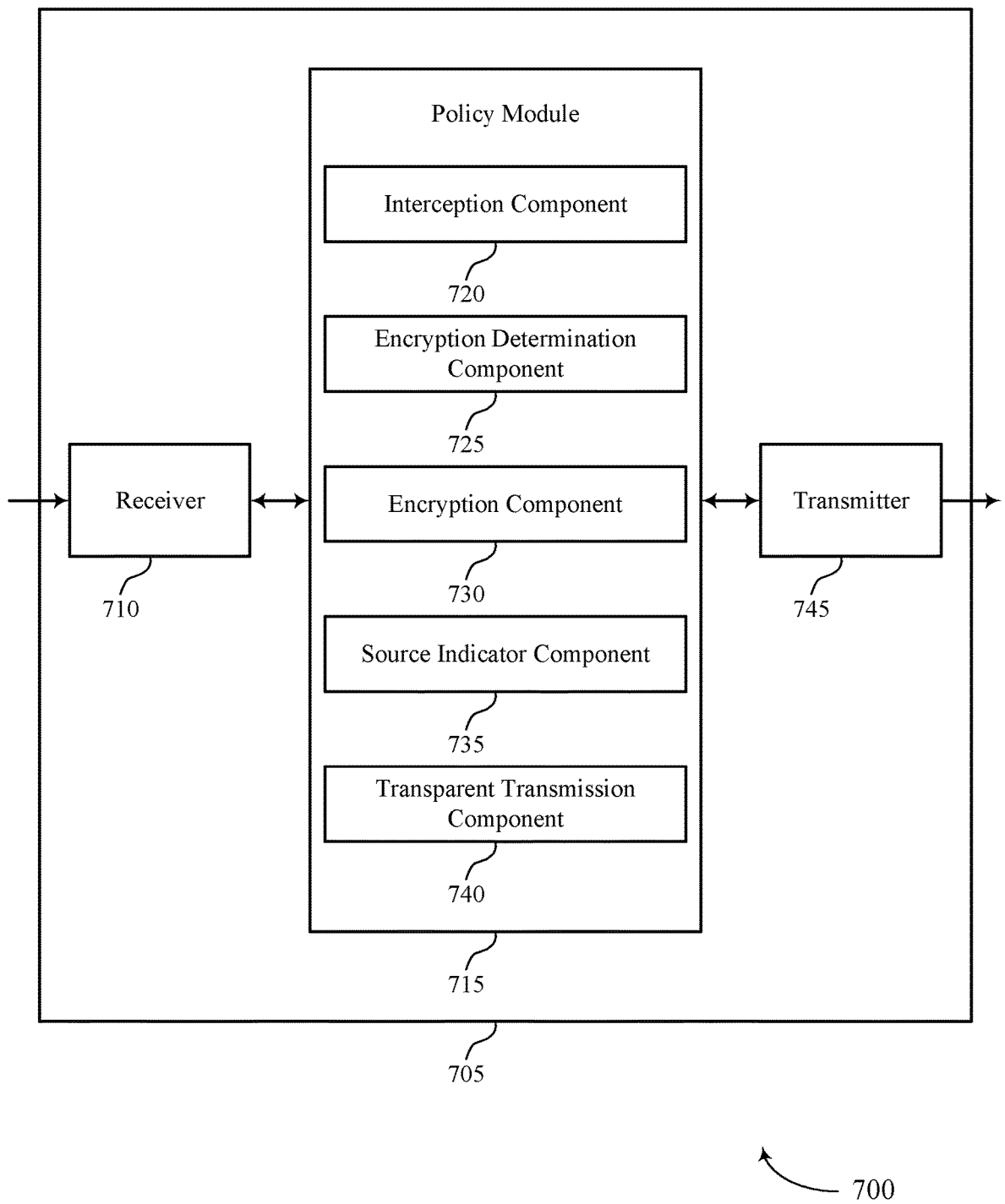
FIG. 7 shows a block diagram of an apparatus that supports transparent enforcement of data policies in accordance with aspects of the present disclosure.

FIG. 7 shows a block diagram 700 of a transparent proxy 705 that supports transparent enforcement of data policies in accordance with aspects of the present disclosure. The transparent proxy 705 may include a receiver 710, a policy module 715, and a transmitter 745. The transparent proxy 705 may also include a processor. Transparent proxy 705 may be an example of a transparent proxy as described above with reference to FIGS. 1-6. Each of these components may be in communication with one another (e.g., via one or more buses).

The receiver 710 may receive information such as packets, user data, or control information associated with various information channels (e.g., control channels, data channels, and information related to transparent enforcement of data policies, etc.). Information may be passed on to other components of the transparent proxy 705. The receiver 710 may be an example of aspects of the I/O controller 940 described with reference to FIG. 9. The receiver 710 may utilize a single antenna or a set of antennas.

The policy module 715 may include an interception component 720, an encryption determination component 725, an encryption component 730, a source indicator component 735, and a transparent transmission component 740. The policy module 715 may be an example of aspects of the policy module 915 described herein.

The interception component 720 may intercept, at a transparent proxy, the data stream transmitted from a source host to a target host.

The encryption determination component 725 may determine that a portion of the data stream fails to comply with a specific encryption policy.

The encryption component 730 may encrypt the portion of the data stream according to the specific encryption policy based on the determination.

The source indicator component 735 may modify a source header of the data stream to include a source indicator of the source host such that the data stream is identifiable as a transmission by the source host based on the modified source header.

The transparent transmission component 740 may transmit, to the target host, the data stream with the modified source header.

The transmitter 745 may transmit signals generated by other components of the transparent proxy 705. In some examples, the transmitter 745 may be collocated with a receiver 710 in a transceiver module. For example, the transmitter 745 may be an example of aspects of the I/O controller 940 described with reference to FIG. 9. The transmitter 745 may utilize a single antenna or a set of antennas.

Figure 8:
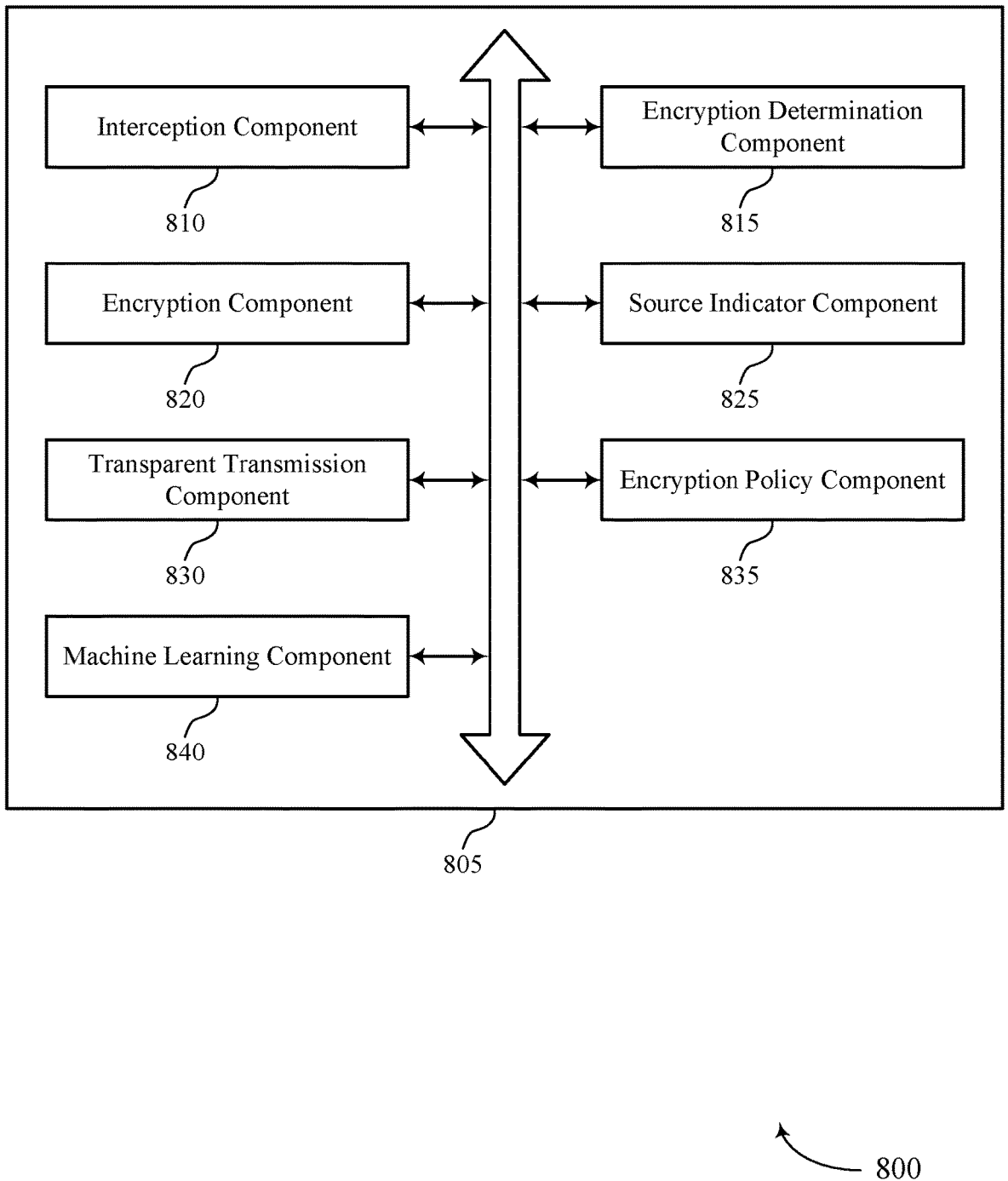
FIG. 8 shows a block diagram of a policy module that supports transparent enforcement of data policies in accordance with aspects of the present disclosure.

FIG. 8 shows a block diagram 800 of a policy module 805 that supports transparent enforcement of data policies in accordance with aspects of the present disclosure. The policy module 805 may be an example of aspects of a policy module 715 or a policy module 915 described herein. The policy module 805 may include an interception component 810, an encryption determination component 815, an encryption component 820, a source indicator component 825, a transparent transmission component 830, an encryption policy component 835, and a machine learning component 840. Policy module 805 may be part of a transparent proxy as described above with reference to FIGS. 1-7. Each of these modules may communicate, directly or indirectly, with one another (e.g., via one or more buses).

The interception component 810 may intercept, at a transparent proxy, the data stream transmitted from a source host to a target host. In some cases, the source host, the target host, or a combination thereof include a virtual machine configuration, a bare metal configuration, a container configuration, or a combination thereof. Additionally, the transparent proxy is deployed on a per physical host basis. In some cases, the transparent proxy supports one or more virtual machines, one or more containers, or a combination thereof, and, as such, the one or more virtual machines, the one or more containers, or the combination thereof may include one physical host. In some cases, the data stream includes TCP traffic, UDP traffic, or a combination thereof.

The encryption determination component 815 may determine that a portion of the data stream fails to comply with a specific encryption policy. Additionally or alternatively, the encryption determination component 815 may determine that an additional portion of the data stream is encrypted according to the specific encryption policy. In some examples, the encryption determination component 815 may determine whether a protocol for the data stream, an IP address for the source host, a port for the source host, an IP address for the target host, a port for the target host, or a combination thereof corresponds to a secure connection using the specific encryption policy when determining whether the data stream complies with the specific encryption policy or not.

The encryption component 820 may encrypt the portion of the data stream according to the specific encryption policy based on the determination.

The source indicator component 825 may modify a source header of the data stream to include a source indicator of the source host such that the data stream is identifiable as a transmission by the source host based on the modified source header.

The transparent transmission component 830 may transmit, to the target host, the data stream with the modified source header. Additionally or alternatively, the transparent transmission component 830 may transmit, to the target host, the data stream without encrypting the additional portion of the data stream, where transmitting the data stream without encrypting the additional portion avoids double encryption of the data stream. In some examples, the transparent transmission component 830 may establish a TLS or mTLS tunnel with a second transparent proxy at the target host. In some examples, the transparent transmission component 830 may transmit the data stream through the TLS or mTLS tunnel to the second transparent proxy at the target host.

The encryption policy component 835 may retrieve the specific encryption policy from a local memory cache. In some examples, the encryption policy component 835 may receive, from a local memory cache, a cache-miss indication for the specific encryption policy. Accordingly, the encryption policy component 835 may retrieve the specific encryption policy on demand from an encryption policy manager based on the cache-miss indication. In some examples, the encryption policy component 835 may refresh the local memory cache periodically from the encryption policy manager, where refreshing the local memory cache includes updating the specific encryption policy stored at the local memory cache.

The machine learning component 840 may modify a set of rules for an encryption policy engine based on determining that the portion of the data stream is not encrypted according to the specific encryption policy. In some examples, the machine learning component 840 may intercept, at the transparent proxy, an additional data stream transmitted from the source host to the target host. In some examples, the machine learning component 840 may determine that a portion of the additional data stream fails to comply with the specific encryption policy based on the modified set of rules for the encryption policy engine.

Figure 9:
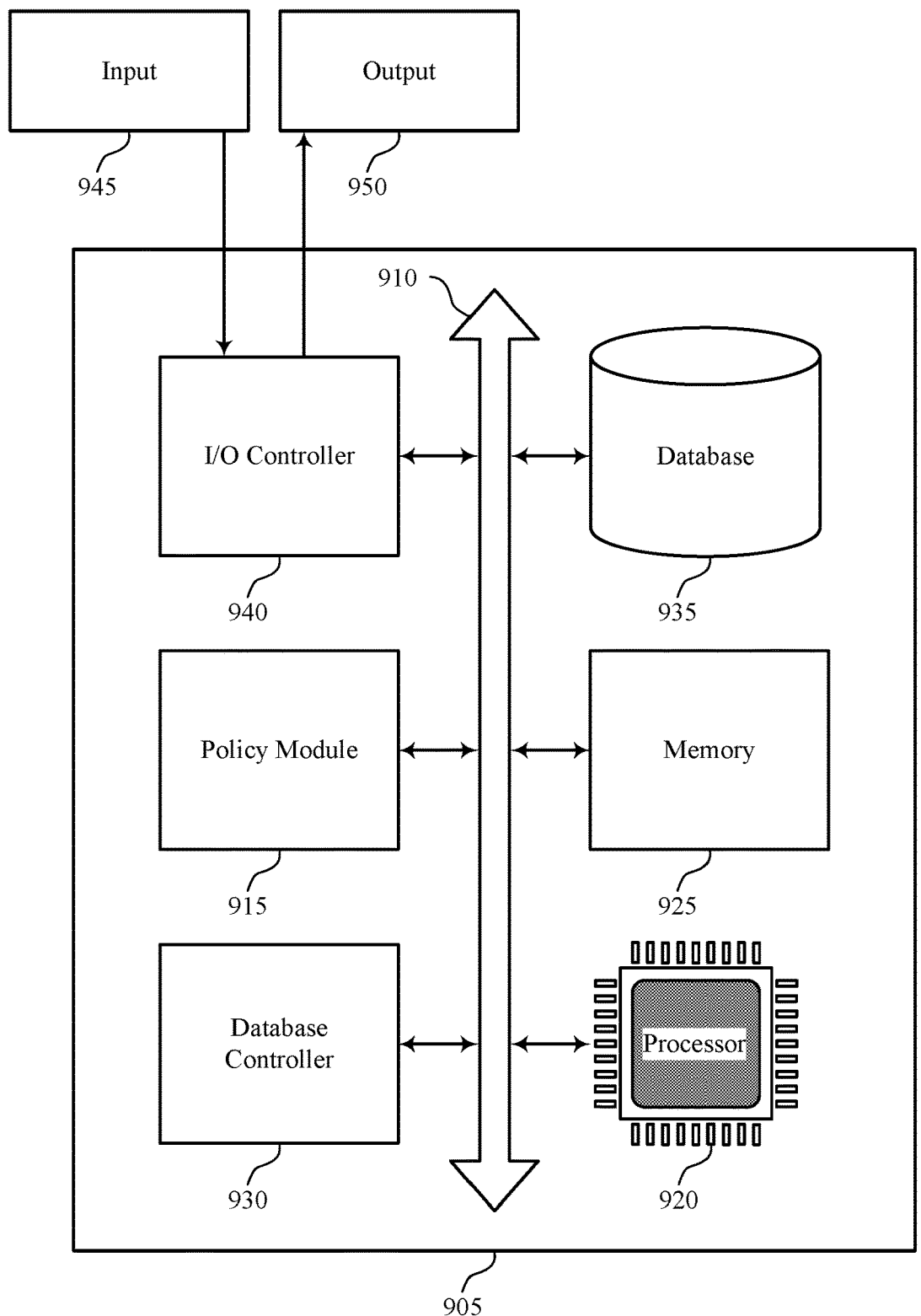
FIG. 9 shows a diagram of a system including a device that supports transparent enforcement of data policies in accordance with aspects of the present disclosure.

FIG. 9 shows a diagram of a system 900 including a device 905 that supports template-driven multi-tenant workflow processing in accordance with aspects of the present disclosure. Device 905 may be an example of or include the components of a transparent proxy as described above, e.g., with reference to FIGS. 1-8. Device 905 may include components for bi-directional data communications including components for transmitting and receiving communications, including policy module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device (PLD), a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting template-driven multi-tenant workflow processing).

Memory 925 may include random access memory (RAM) and read only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
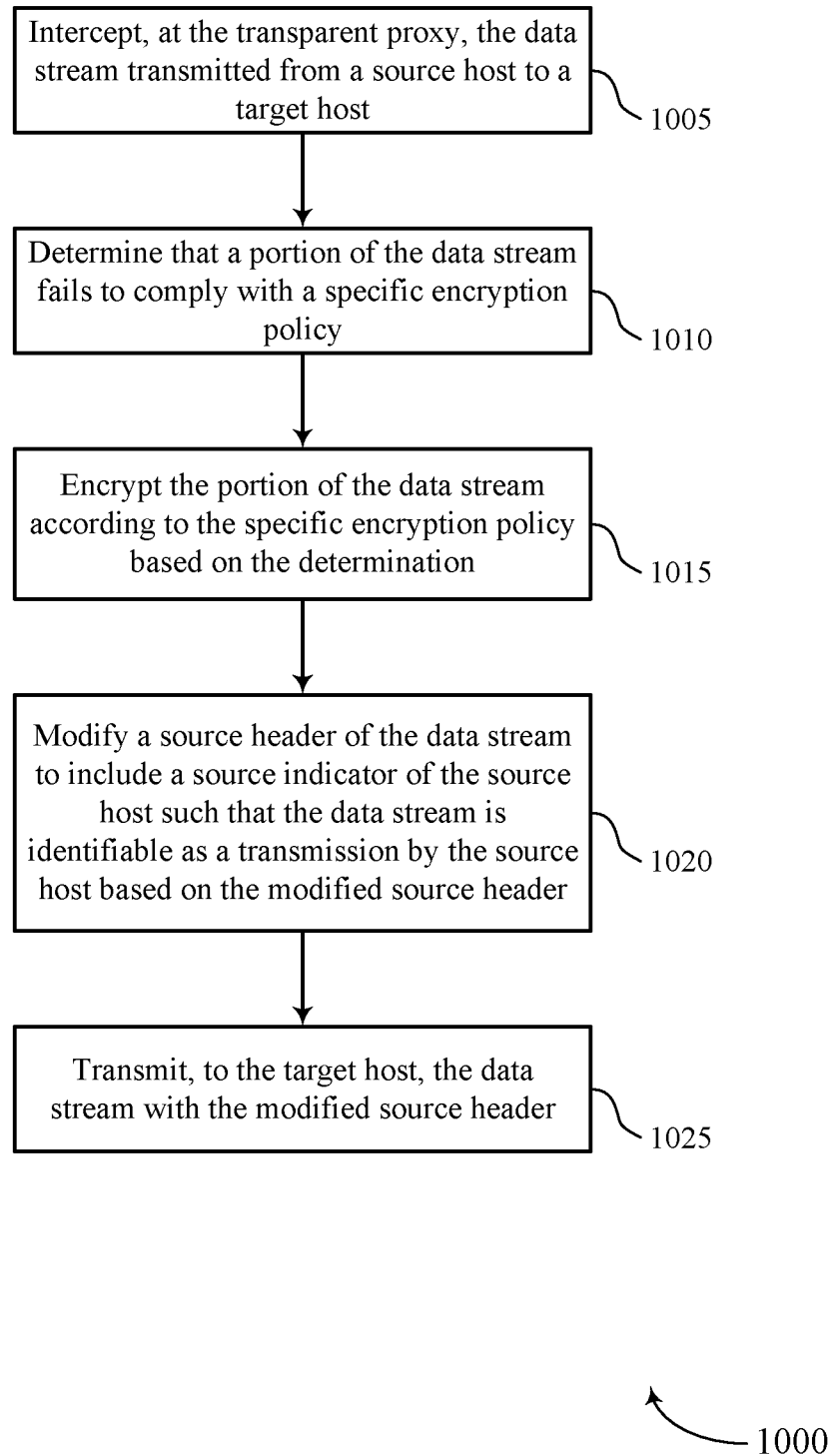
FIGS. 10 through 13 show flowcharts illustrating methods that support transparent enforcement of data policies in accordance with aspects of the present disclosure.

FIG. 10 shows a flowchart illustrating a method 1000 that supports transparent enforcement of data policies in accordance with aspects of the present disclosure. The operations of method 1000 may be implemented by a device or its components as described herein. For example, the operations of method 1000 may be performed by a policy module as described with reference to FIGS. 7 through 9. In some examples, a device may execute a set of instructions to control the functional elements of the device to perform the functions described below. Additionally or alternatively, a device may perform aspects of the functions described below using special-purpose hardware.

At 1005, the device may intercept, at the transparent proxy, the data stream transmitted from a source host to a target host. The operations of 1005 may be performed according to the methods described herein. In some examples, aspects of the operations of 1005 may be performed by an interception component as described with reference to FIGS. 7 through 9.

At 1010, the device may determine that a portion of the data stream fails to comply with a specific encryption policy. The operations of 1010 may be performed according to the methods described herein. In some examples, aspects of the operations of 1010 may be performed by an encryption determination component as described with reference to FIGS. 7 through 9.

At 1015, the device may encrypt the portion of the data stream according to the specific encryption policy based on the determination. The operations of 1015 may be performed according to the methods described herein. In some examples, aspects of the operations of 1015 may be performed by an encryption component as described with reference to FIGS. 7 through 9.

At 1020, the device may modify a source header of the data stream to include a source indicator of the source host such that the data stream is identifiable as a transmission by the source host based on the modified source header. The operations of 1020 may be performed according to the methods described herein. In some examples, aspects of the operations of 1020 may be performed by a source indicator component as described with reference to FIGS. 7 through 9.

At 1025, the device may transmit, to the target host, the data stream with the modified source header. The operations of 1025 may be performed according to the methods described herein. In some examples, aspects of the operations of 1025 may be performed by a transparent transmission component as described with reference to FIGS. 7 through 9.

Figure 11:
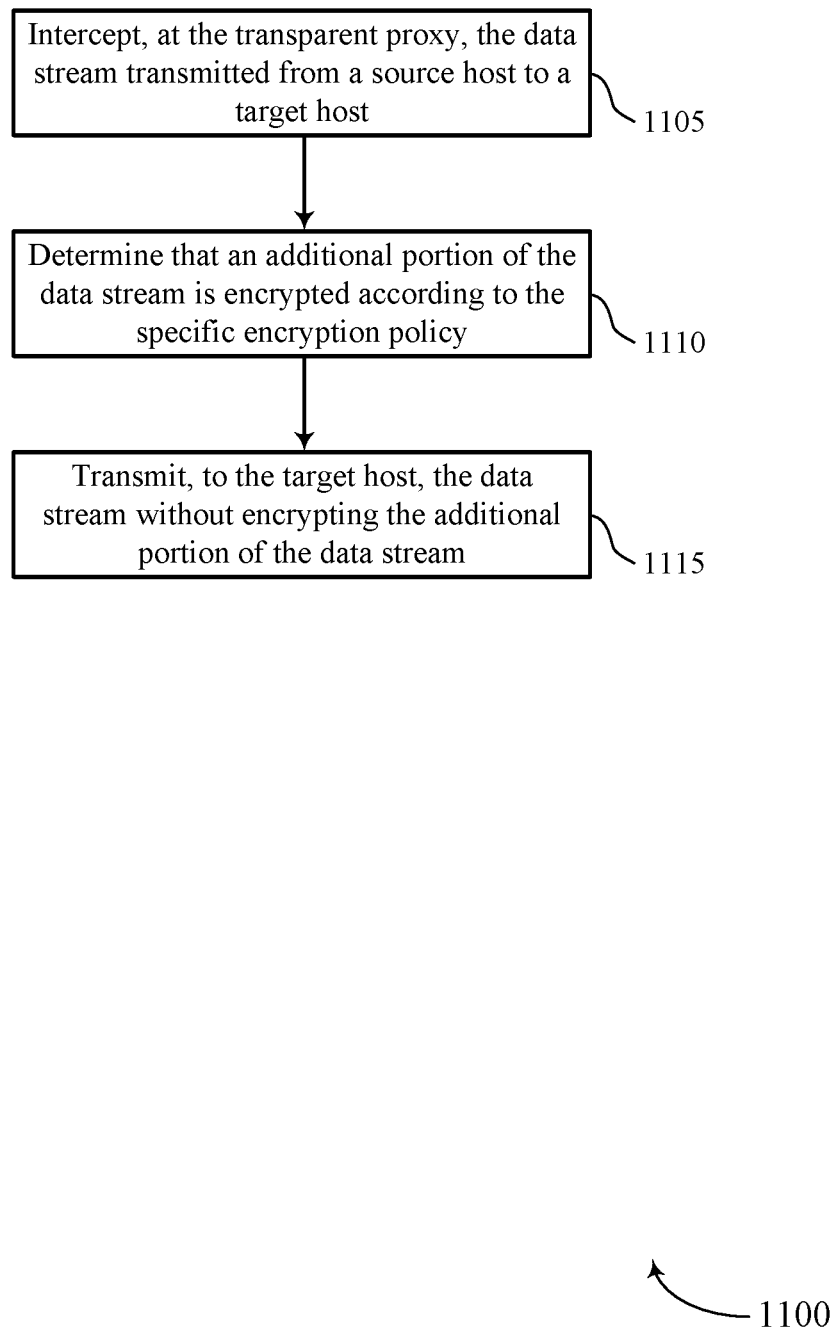

FIG. 11 shows a flowchart illustrating a method 1100 that supports transparent enforcement of data policies in accordance with aspects of the present disclosure. The operations of method 1100 may be implemented by a device or its components as described herein. For example, the operations of method 1100 may be performed by a policy module as described with reference to FIGS. 7 through 9. In some examples, a device may execute a set of instructions to control the functional elements of the device to perform the functions described below. Additionally or alternatively, a device may perform aspects of the functions described below using special-purpose hardware.

At 1105, the device may intercept, at the transparent proxy, the data stream transmitted from a source host to a target host. The operations of 1105 may be performed according to the methods described herein. In some examples, aspects of the operations of 1105 may be performed by an interception component as described with reference to FIGS. 7 through 9.

At 1110, the device may determine that an additional portion of the data stream is encrypted according to the specific encryption policy. The operations of 1110 may be performed according to the methods described herein. In some examples, aspects of the operations of 1110 may be performed by an encryption determination component as described with reference to FIGS. 7 through 9.

At 1115, the device may transmit, to the target host, the data stream without encrypting the additional portion of the data stream. The operations of 1115 may be performed according to the methods described herein. In some examples, aspects of the operations of 1115 may be performed by a transparent transmission component as described with reference to FIGS. 7 through 9.

Figure 12:
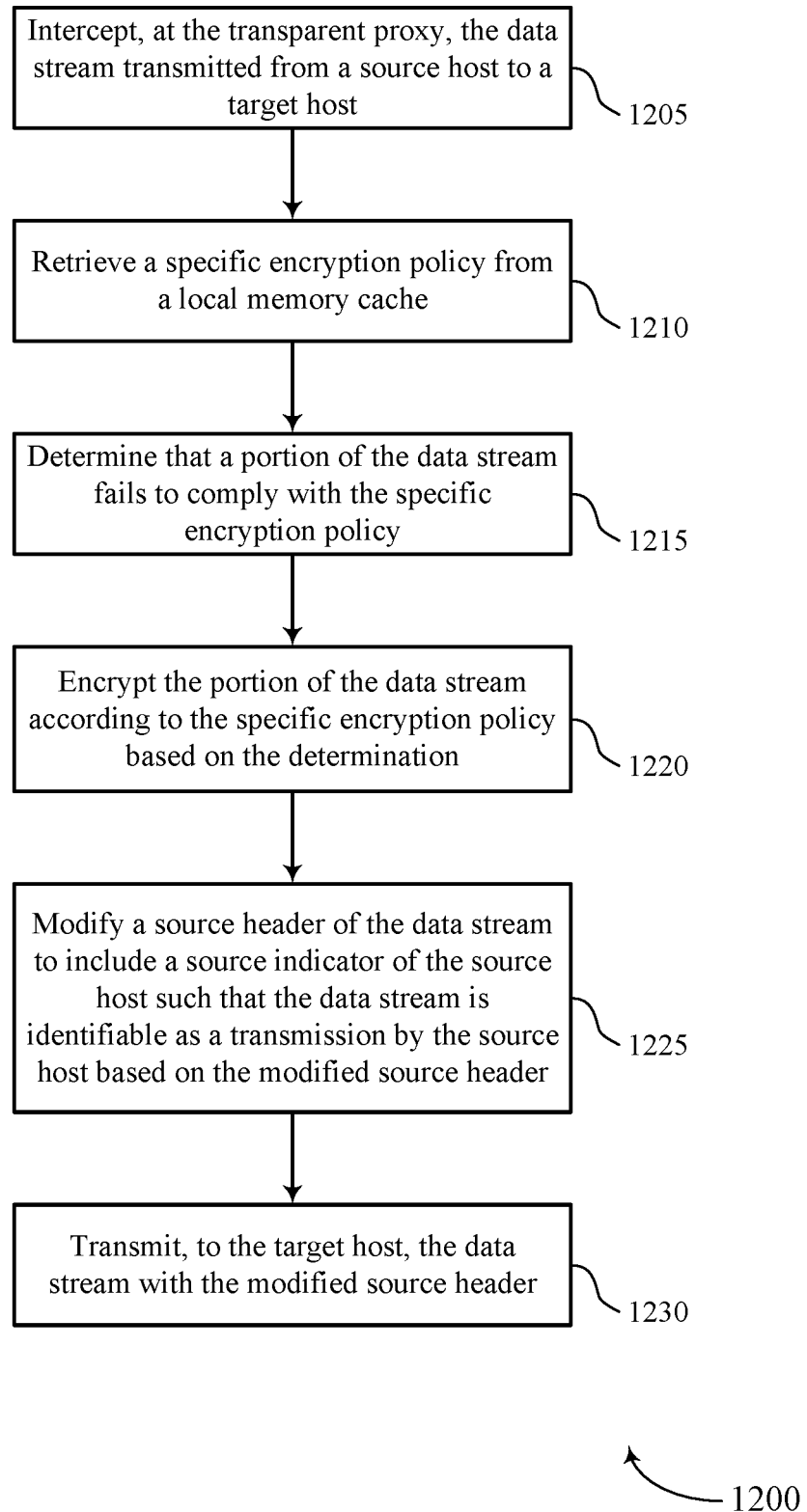

FIG. 12 shows a flowchart illustrating a method 1200 that supports transparent enforcement of data policies in accordance with aspects of the present disclosure. The operations of method 1200 may be implemented by a device or its components as described herein. For example, the operations of method 1200 may be performed by a policy module as described with reference to FIGS. 7 through 9. In some examples, a device may execute a set of instructions to control the functional elements of the device to perform the functions described below. Additionally or alternatively, a device may perform aspects of the functions described below using special-purpose hardware.

At 1205, the device may intercept, at the transparent proxy, the data stream transmitted from a source host to a target host. The operations of 1205 may be performed according to the methods described herein. In some examples, aspects of the operations of 1205 may be performed by an interception component as described with reference to FIGS. 7 through 9.

At 1210, the device may retrieve the specific encryption policy from a local memory cache. The operations of 1210 may be performed according to the methods described herein. In some examples, aspects of the operations of 1210 may be performed by an encryption policy component as described with reference to FIGS. 7 through 9.

At 1215, the device may determine that a portion of the data stream fails to comply with a specific encryption policy. The operations of 1215 may be performed according to the methods described herein. In some examples, aspects of the operations of 1215 may be performed by an encryption determination component as described with reference to FIGS. 7 through 9.

At 1220, the device may encrypt the portion of the data stream according to the specific encryption policy based on the determination. The operations of 1220 may be performed according to the methods described herein. In some examples, aspects of the operations of 1220 may be performed by an encryption component as described with reference to FIGS. 7 through 9.

At 1225, the device may modify a source header of the data stream to include a source indicator of the source host such that the data stream is identifiable as a transmission by the source host based on the modified source header. The operations of 1225 may be performed according to the methods described herein. In some examples, aspects of the operations of 1225 may be performed by a source indicator component as described with reference to FIGS. 7 through 9.

At 1230, the device may transmit, to the target host, the data stream with the modified source header. The operations of 1230 may be performed according to the methods described herein. In some examples, aspects of the operations of 1230 may be performed by a transparent transmission component as described with reference to FIGS. 7 through 9.

Figure 13:
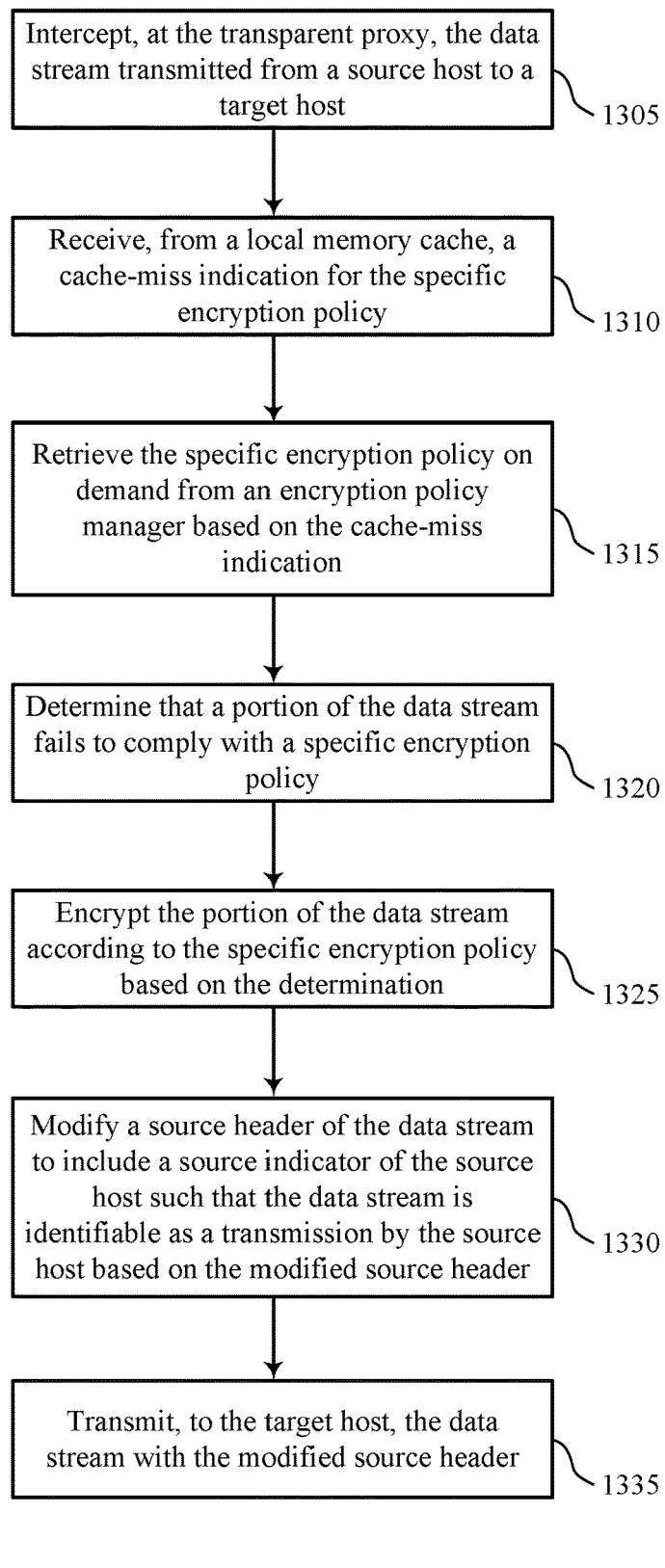

FIG. 13 shows a flowchart illustrating a method 1300 that supports transparent enforcement of data policies in accordance with aspects of the present disclosure. The operations of method 1300 may be implemented by a device or its components as described herein. For example, the operations of method 1300 may be performed by a policy module as described with reference to FIGS. 7 through 9. In some examples, a device may execute a set of instructions to control the functional elements of the device to perform the functions described below. Additionally or alternatively, a device may perform aspects of the functions described below using special-purpose hardware.

At 1305, the device may intercept, at the transparent proxy, the data stream transmitted from a source host to a target host. The operations of 1305 may be performed according to the methods described herein. In some examples, aspects of the operations of 1305 may be performed by an interception component as described with reference to FIGS. 7 through 9.

At 1310, the device may receive, from a local memory cache, a cache-miss indication for the specific encryption policy. The operations of 1310 may be performed according to the methods described herein. In some examples, aspects of the operations of 1310 may be performed by an encryption policy component as described with reference to FIGS. 7 through 9.

At 1315, the device may retrieve the specific encryption policy on demand from an encryption policy manager based on the cache-miss indication. The operations of 1315 may be performed according to the methods described herein. In some examples, aspects of the operations of 1315 may be performed by an encryption policy component as described with reference to FIGS. 7 through 9.

At 1320, the device may determine that a portion of the data stream fails to comply with a specific encryption policy. The operations of 1320 may be performed according to the methods described herein. In some examples, aspects of the operations of 1320 may be performed by an encryption determination component as described with reference to FIGS. 7 through 9.

At 1325, the device may encrypt the portion of the data stream according to the specific encryption policy based on the determination. The operations of 1325 may be performed according to the methods described herein. In some examples, aspects of the operations of 1325 may be performed by an encryption component as described with reference to FIGS. 7 through 9.

At 1330, the device may modify a source header of the data stream to include a source indicator of the source host such that the data stream is identifiable as a transmission by the source host based on the modified source header. The operations of 1330 may be performed according to the methods described herein. In some examples, aspects of the operations of 1330 may be performed by a source indicator component as described with reference to FIGS. 7 through 9.

At 1335, the device may transmit, to the target host, the data stream with the modified source header. The operations of 1335 may be performed according to the methods described herein. In some examples, aspects of the operations of 1335 may be performed by a transparent transmission component as described with reference to FIGS. 7 through 9.

A method of applying data policies to a data stream at a transparent proxy is described. The method may include intercepting, at the transparent proxy, the data stream transmitted from a source host to a target host, determining that a portion of the data stream fails to comply with a specific encryption policy, encrypting the portion of the data stream according to the specific encryption policy based on the determination, modifying a source header of the data stream to include a source indicator of the source host such that the data stream is identifiable as a transmission by the source host based on the modified source header, and transmitting, to the target host, the data stream with the modified source header.

An apparatus for applying data policies to a data stream at a transparent proxy is described. The apparatus may include a processor, memory in electronic communication with the processor, and instructions stored in the memory. The instructions may be executable by the processor to cause the apparatus to intercept, at the transparent proxy, the data stream transmitted from a source host to a target host, determine that a portion of the data stream fails to comply with a specific encryption policy, encrypt the portion of the data stream according to the specific encryption policy based on the determination, modify a source header of the data stream to include a source indicator of the source host such that the data stream is identifiable as a transmission by the source host based on the modified source header, and transmit, to the target host, the data stream with the modified source header.

Another apparatus for applying data policies to a data stream at a transparent proxy is described. The apparatus may include means for intercepting, at the transparent proxy, the data stream transmitted from a source host to a target host, determining that a portion of the data stream fails to comply with a specific encryption policy, encrypting the portion of the data stream according to the specific encryption policy based on the determination, modifying a source header of the data stream to include a source indicator of the source host such that the data stream is identifiable as a transmission by the source host based on the modified source header, and transmitting, to the target host, the data stream with the modified source header.

A non-transitory computer-readable medium storing code for applying data policies to a data stream at a transparent proxy is described. The code may include instructions executable by a processor to intercept, at the transparent proxy, the data stream transmitted from a source host to a target host, determine that a portion of the data stream fails to comply with a specific encryption policy, encrypt the portion of the data stream according to the specific encryption policy based on the determination, modify a source header of the data stream to include a source indicator of the source host such that the data stream is identifiable as a transmission by the source host based on the modified source header, and transmit, to the target host, the data stream with the modified source header.

Some examples of the method, apparatuses, and non-transitory computer-readable medium described herein may further include operations, features, means, or instructions for determining that an additional portion of the data stream may be encrypted according to the specific encryption policy and transmitting, to the target host, the data stream without encrypting the additional portion of the data stream.

Some examples of the method, apparatuses, and non-transitory computer-readable medium described herein may further include operations, features, means, or instructions for transmitting the data stream without encrypting the additional portion avoids double encryption of the data stream.

In some examples of the method, apparatuses, and non-transitory computer-readable medium described herein, determining that the portion of the data stream fails to comply with the specific encryption policy may include operations, features, means, or instructions for determining whether a protocol for the data stream, an IP address for the source host, a port for the source host, an IP address for the target host, a port for the target host, or a combination thereof corresponds to a secure connection using the specific encryption policy.

Some examples of the method, apparatuses, and non-transitory computer-readable medium described herein may further include operations, features, means, or instructions for retrieving the specific encryption policy from a local memory cache.

Some examples of the method, apparatuses, and non-transitory computer-readable medium described herein may further include operations, features, means, or instructions for receiving, from a local memory cache, a cache-miss indication for the specific encryption policy and retrieving the specific encryption policy on demand from an encryption policy manager based on the cache-miss indication.

Some examples of the method, apparatuses, and non-transitory computer-readable medium described herein may further include operations, features, means, or instructions for refreshing the local memory cache periodically from the encryption policy manager, where refreshing the local memory cache includes updating the specific encryption policy stored at the local memory cache.

Some examples of the method, apparatuses, and non-transitory computer-readable medium described herein may further include operations, features, means, or instructions for modifying a set of rules for an encryption policy engine based on determining that the portion of the data stream may be not encrypted according to the specific encryption policy, intercepting, at the transparent proxy, an additional data stream transmitted from the source host to the target host and determining that a portion of the additional data stream fails to comply with the specific encryption policy based on the modified set of rules for the encryption policy engine.

In some examples of the method, apparatuses, and non-transitory computer-readable medium described herein, the source host, the target host, or a combination thereof include a virtual machine configuration, a bare metal configuration, a container configuration, or a combination thereof.

In some examples of the method, apparatuses, and non-transitory computer-readable medium described herein, the data stream includes TCP traffic, UDP traffic, or a combination thereof.

In some examples of the method, apparatuses, and non-transitory computer-readable medium described herein, the transparent proxy may be deployed on a per physical host basis.

In some examples of the method, apparatuses, and non-transitory computer-readable medium described herein, the transparent proxy supports one or more virtual machines, one or more containers, or a combination thereof, and where the one or more virtual machines, the one or more containers, or the combination thereof include one physical host.

In some examples of the method, apparatuses, and non-transitory computer-readable medium described herein, transmitting the data stream further may include operations, features, means, or instructions for establishing a TLS or mTLS tunnel with a second transparent proxy at the target host and transmitting the data stream through the TLS or mTLS tunnel to the second transparent proxy at the target host.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of applying data policies to a data stream at a transparent proxy, comprising:
   intercepting, at the transparent proxy, the data stream transmitted from a source host to a target host;
   identifying, at the transparent proxy, a bit from an encryption policy manager that indicates whether an encryption policy at the target host of the intercepted data stream satisfies an encryption policy standard;
   determining, at the transparent proxy and based at least in part on the bit, that a first portion of the data stream fails to comply with the encryption policy standard and that a second portion of the data stream is encrypted according to the encryption policy standard;
   encrypting, at the transparent proxy, the first portion of the data stream according to the encryption policy standard based at least in part on the determination, wherein the encrypting at the transparent proxy updates a source header of the data stream to include an identifier of the transparent proxy;
   refraining from encrypting, at the transparent proxy, the second portion of the data stream based at least in part on the determination;
   modifying, at the transparent proxy, the source header of the data stream which includes the identifier of the transparent proxy based at least in part on the encrypting to instead include a source indicator of the source host such that the data stream is identifiable as a transmission by the source host instead of the transparent proxy based at least in part on the modified source header; and
   transmitting, to the target host and from the transparent proxy, the data stream with the modified source header.

2. The method of claim 1, wherein refraining from encrypting the second portion avoids double encryption of the data stream.

3. The method of claim 1, wherein determining that the first portion of the data stream fails to comply with the encryption policy standard comprises:
   determining whether a protocol for the data stream, an internet protocol (IP) address for the source host, a port for the source host, an IP address for the target host, a port for the target host, or a combination thereof corresponds to a secure connection using the encryption policy standard.

4. The method of claim 1, further comprising:
   retrieving the encryption policy standard from a local memory cache.

5. The method of claim 1, further comprising:
   receiving, from a local memory cache, a cache-miss indication for the encryption policy standard; and
   retrieving the encryption policy standard on demand from the encryption policy manager based at least in part on the cache-miss indication.

6. The method of claim 5, further comprising:
   refreshing the local memory cache periodically from the encryption policy manager, wherein refreshing the local memory cache comprises updating the encryption policy standard stored at the local memory cache.

7. The method of claim 1, further comprising:
   modifying a set of rules for an encryption policy engine based at least in part on determining that the first portion of the data stream is not encrypted according to the encryption policy standard;
   intercepting, at the transparent proxy, an additional data stream transmitted from the source host to the target host; and
   determining that a portion of the additional data stream fails to comply with the encryption policy standard based at least in part on the modified set of rules for the encryption policy engine.

8. The method of claim 1, wherein the source host, the target host, or a combination thereof comprise a virtual machine configuration, a bare metal configuration, a container configuration, or a combination thereof.

9. The method of claim 1, wherein the data stream comprises transmission control protocol (TCP) traffic, user datagram protocol (UDP) traffic, or a combination thereof.

10. The method of claim 1, wherein the transparent proxy is deployed on a per physical host basis.

11. The method of claim 10, wherein the transparent proxy supports one or more virtual machines, one or more containers, or a combination thereof, and wherein the one or more virtual machines, the one or more containers, or the combination thereof comprise one physical host.

12. The method of claim 1, wherein transmitting the data stream further comprises:
    establishing a transport layer security (TLS) or mutual TLS (mTLS) tunnel with a second transparent proxy at the target host; and
    transmitting the data stream through the TLS or mTLS tunnel to the second transparent proxy at the target host.

13. An apparatus for applying data policies to a data stream at a transparent proxy, comprising:
    a processor,
    memory in electronic communication with the processor; and
    instructions stored in the memory and executable by the processor to cause the apparatus to:
      intercept, at the transparent proxy, the data stream transmitted from a source host to a target host;
      identify, at the transparent proxy, a bit from an encryption policy manager that indicates whether an encryption policy at the target host of the intercepted data stream satisfies an encryption policy standard;
      determine, at the transparent proxy and based at least in part on the that a first portion of the data stream fails to comply with the encryption policy standard and that a second portion of the data stream is encrypted according to the encryption policy standard;
      encrypt, at the transparent proxy, the first portion of the data stream according to the encryption policy standard based at least in part on the determination, wherein the encrypting at the transparent proxy updates a source header of the data stream to include an identifier of the transparent proxy;
      refrain from encrypting, at the transparent proxy, the second portion of the data stream based at least in part on the determination;
      modify, at the transparent proxy, the source header of the data stream which includes the identifier of the transparent proxy based at least in part on the encrypting to instead include a source indicator of the source host such that the data stream is identifiable as a transmission by the source host instead of the transparent proxy based at least in part on the modified source header; and
      transmit, to the target host and from the transparent proxy, the data stream with the modified source header.

14. The apparatus of claim 13, wherein refraining from encrypting the second portion avoids double encryption of the data stream.

15. The apparatus of claim 13, wherein the instructions to determine that the first portion of the data stream fails to comply with the encryption policy standard are executable by the processor to cause the apparatus to:
  determine whether a protocol for the data stream, an internet protocol (IP) address for the source host, a port for the source host, an IP address for the target host, a port for the target host, or a combination thereof corresponds to a secure connection using the encryption policy standard.

16. The apparatus of claim 13, wherein the instructions are further executable by the processor to cause the apparatus to:
  retrieve the encryption policy standard from a local memory cache.

17. The apparatus of claim 13, wherein the instructions are further executable by the processor to cause the apparatus to:
  receive, from a local memory cache, a cache-miss indication for the encryption policy standard; and
  retrieve the encryption policy standard on demand from the encryption policy manager based at least in part on the cache-miss indication.

18. A non-transitory computer-readable medium storing code for applying data policies to a data stream at a transparent proxy, the code comprising instructions executable by a processor to:
  intercept, at the transparent proxy, the data stream transmitted from a source host to a target host;
  identify, at the transparent proxy, a bit from an encryption policy manager that indicates whether an encryption policy at the target host of the intercepted data stream satisfies an encryption policy standard;
  determine, at the transparent proxy and based at least in part on the bit, that a first portion of the data stream fails to comply with the encryption policy standard and that a second portion of the data stream is encrypted according to the encryption policy standard;
  encrypt, at the transparent proxy, the first portion of the data stream according to the encryption policy standard based at least in part on the determination, wherein the encrypting at the transparent proxy updates a source header of the data stream to include an identifier of the transparent proxy;
  refrain from encrypting, at the transparent proxy, the second portion of the data stream based at least in part on the determination;
  modify, at the transparent proxy, the source header of the data stream which includes the identifier of the transparent proxy based at least in part on the encrypting to instead include a source indicator of the source host such that the data stream is identifiable as a transmission by the source host instead of the transparent proxy based at least in part on the modified source header; and
  transmit, to the target host and from the transparent proxy, the data stream with the modified source header.

* * * * *